United States Patent [19]
Cho et al.

[11] Patent Number: 5,257,055
[45] Date of Patent: Oct. 26, 1993

[54] VIEW FINDER FOR CAMERA WITH DIFFERENT SELECTABLE FINDER FIELD FRAMES

[75] Inventors: Michio Cho; Kazuo Kamata, both of Tokyo, Japan

[73] Assignee: Fuji Photo Film Co., Ltd., Kanagawa, Japan

[21] Appl. No.: 912,712

[22] Filed: Jul. 13, 1992

Related U.S. Application Data

[63] Continuation of Ser. No. 611,665, Nov. 13, 1990, abandoned.

[30] Foreign Application Priority Data

Nov. 13, 1989 [JP] Japan .............................. 1-131887[U]
Jan. 29, 1990 [JP] Japan ................................ 2-7746[U]
Jun. 8, 1990 [JP] Japan ............................... 2-60778[U]

[51] Int. Cl.⁵ .............................................. G03B 13/10
[52] U.S. Cl. .................................................. 354/222
[58] Field of Search ............... 354/155, 159, 221, 222, 354/94, 219, 225

[56] References Cited

U.S. PATENT DOCUMENTS

| | | | |
|---|---|---|---|
| 2,528,840 | 11/1950 | Mitchell | 354/221 |
| 3,011,385 | 12/1961 | Frost | 354/222 |
| 3,377,911 | 4/1968 | Mische et al. | 354/222 |
| 4,529,283 | 7/1985 | Oshima et al. | 354/222 X |
| 4,697,901 | 10/1987 | Wakabayashi et al. | 354/221 |

Primary Examiner—Michael L. Gellner
Assistant Examiner—J. K. Han
Attorney, Agent, or Firm—Young & Thompson

[57] ABSTRACT

A camera view finder having at least two types of finder field frames such as a full-size field frame and a panoramic field frame, only one of which can be observed in accordance with a selected photography mode. In a first embodiment of an Albada-type inverted Galilean view finder, one of two types of finder field frames is light-shielded by a blocking member. In a second embodiment, a finder field frame is formed on each of at least two adjacent surfaces of a transparent cubic body which is rotated to position a selected finder field frame in the finder optical path. For a Keplerian view finder, a finder field frame is formed on each side of a transparent plate which is moved along the finder optical path to position a selected one finder field frame in the real image plane.

13 Claims, 9 Drawing Sheets 5,257,055

VIEW FINDER FOR CAMERA WITH DIFFERENT SELECTABLE FINDER FIELD FRAMES

This application is a continuation of application Ser. No. 07/611,665, filed Nov. 13, 1990, now abandoned.

BACKGROUND OF THE INVENTION

The present invention relates to a camera view finder, and more particularly, to a view finder in which any one of a plurality of finder field frames can be observed selectively.

The light passing through the taking lens of a single reflex camera is incident on the view finder, so that the finder field and taking lens field coincide. In contrast with this, the view finder of a compact camera is separate from the taking lens so that there is parallax between the finder field and taking lens field. As view finders for compact cameras, there are known Keplerian view finders and inverted Galilean view finders.

Keplerian view finders are comprised by an objective positive lens having for forming a real image of a subject in a real image plane with its top and bottom, and right and left reversed, a prism for converting the real image into an erect image, and a positive eyepiece for enlarging the erected image. Along the finder optical path, a finder field frame for indicating the photographing area, e.g., four L-shaped marks, are disposed in the real image plane of the objective lens. With such a Keplerian view finder, the finder field frame can be observed together with the image of a subject formed in the real image plane.

Inverted Galilean view finders are comprised by a negative lens and a positive eyepiece. As types of inverted Galilean view finders, there are known a bright frame type and an Albada type. In the case of the bright frame type, there is provided a bright frame window which has a plurality of transparent finder field frames. Light passing through the bright frame window is introduced into the view finder optical path so that an image of the finder field frame and the image of the subject are superposed. In the case of the Albada type, a finder field frame is formed on the eyepiece and is observed through the eyepiece as an image of the finder field frame reflected from a half mirror formed on a concave surface of an objective lens. The structure of the view finder of the Albada type is simple, and so it is widely used with compact cameras.

There are known compact cameras which can selectively use either a normal photography mode for taking a subject at a standard focal length or a close-up photography mode for taking an enlarged subject at a near distance. With a compact camera of this type, if the position of the finder field frame is such that during normal photography there is little parallax between the taking lens field and the finder field, the parallax for close-up photography becomes great. In order to compensate for the latter parallax, it is necessary to change the finder field.

There are also known cameras which can selectively use either a full-size photography mode or a half-size photography mode. Recently, it has been desired to develop a compact camera which can selectively use either a full-size photography mode or a panoramic photography mode. With such compact cameras, the size of the picture frame formed on the film changes so that it becomes necessary correspondingly to change the finder field. This problem is present also in single reflex cameras.

There is known an Albada-type inverted Galilean view finder of the type wherein both the near distance finder field frame and the far distance finder field frame are disposed along the finder optical path. The use of two finder field frames poses a problem in that it is difficult for the photographer to determine which finder field frame is to be used. There is also known a bright-frame-type inverted Galilean view finder having a parallax correction device wherein two light shield plates formed with two L-shaped frame marks are moved toward or away from each other as the taking lens is moved for focussing, thereby to adjust the position and size of the finder field. This parallax correction device is however complicated in structure because a linkage mechanism between the taking lens and view finder is required.

OBJECT OF THE INVENTION

It is therefore an object of this invention to provide a camera view finder capable of changing the finder field frame with a simple structure.

SUMMARY OF THE INVENTION

The foregoing and other objects and advantages of this invention are achieved by providing structure allowing the user to observe a selected one of a plurality of finder field frames matching the photography mode employed. According to a preferred embodiment of this invention, there is provided, in the optical path of an Albada-type inverted Galilean view finder, an opaque member for covering and blocking the light from an unused finder field frame. According to another preferred embodiment of this invention, there is disposed, in the optical path of an Albada-type inverted Galilean view finder, a transparent body having at least two finder field frames each of which is formed on a separate surface of the transparent body. A selected one of the finder field frames is positioned in the finder optical path by rotating the transparent body. According to still another preferred embodiment of this invention, a transparent member having a plurality of finder field frames spaced apart a predetermined distance is disposed along a Keplerian view finder optical path. A selected one of the plurality of finder field frames disposed at the real image plane of the object lens can be observed.

BRIEF DESCRIPTION OF THE DRAWINGS

The above and other objects and advantages of this invention will become apparent to persons skilled in the art from the following detailed description of the invention in conjunction with the accompanying drawings, in which.

DETAILED DESCRIPTION OF THE INVENTION

Figure 1:
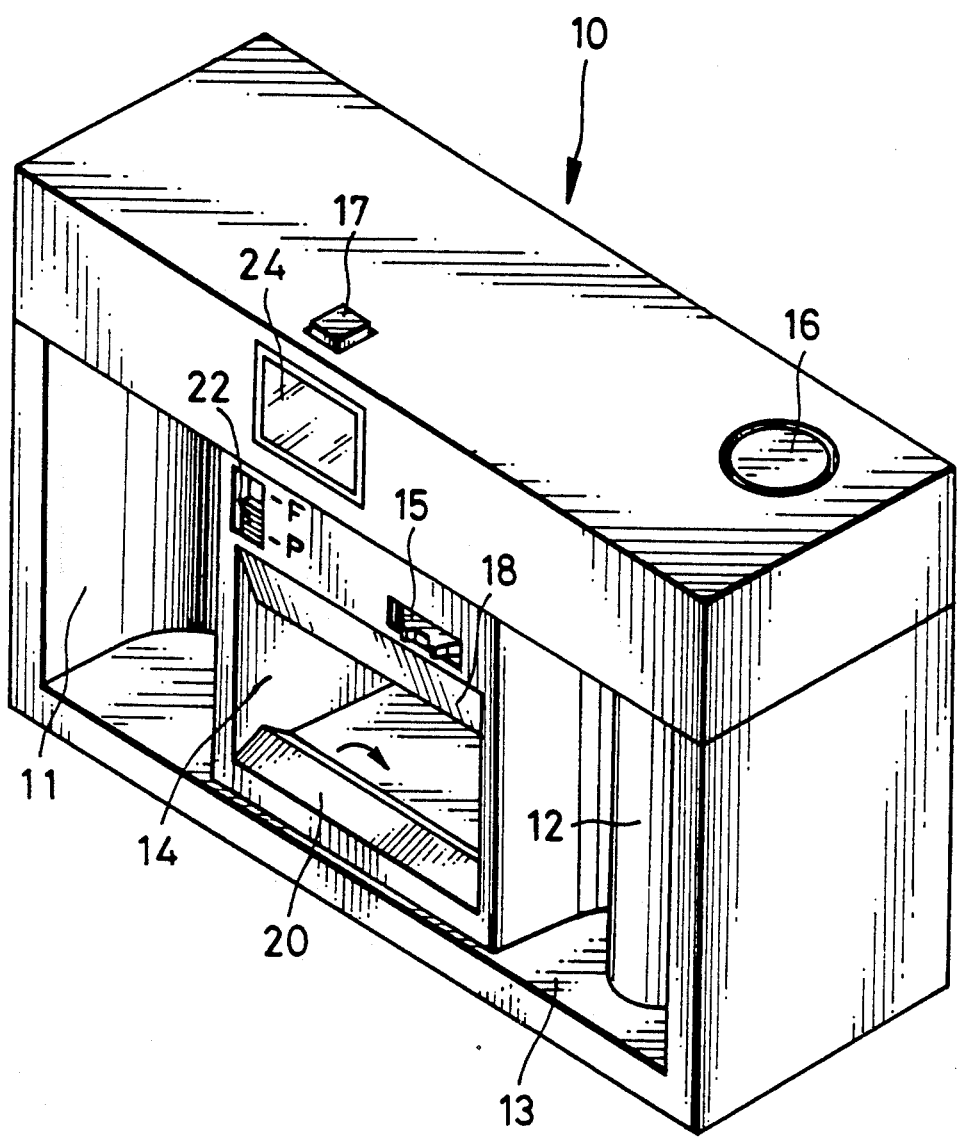
FIG. 1 is a rear perspective view of a compact camera capable of selectively using either a full-size photography mode or a panoramic photography mode, the rear door being omitted in FIG. 1.

Referring to FIG. 1, a camera body 10 with its rear door omitted is formed with a film supply chamber 11 for housing a film cassette (not shown) therein, and a film take-up chamber 13 provided with a film take-up spool 12. Between the film supply chamber 11 and film take-up chamber 13, there is formed an exposure aperture 14 defining the exposure area. The size of the exposure aperture 14 is such that a full-size picture frame (36 mm width and 24 mm height) can be formed on a photographic film of 135 type. There is mounted, at the upper right of the exposure aperture 14 as viewed from the rear, a sprocket wheel 15 for engaging with perforations of the film and transporting it. There are mounted, at the top surface of the camera body 10, a shutter button 16 and a finder field frame selecting button 17.

Mask plates 18 and 20 for defining the photographic area are swingably mounted at the top and bottom of the exposure aperture 14. These mask plates 18 and 20 are swung in the direction indicated by an arrow in the full-size photographic mode so as fully to open the exposure aperture 14. The mask plates 18 and 20 are set in the positions shown in FIG. 1 in the panoramic photography mode to optically shield the upper and lower portions of the exposure aperture 14 and to form an elongated picture frame on the film. A picture frame taken in the panoramic photography mode can be printed as a panoramic photoprint having a size (252 mm width, 89 mm height) in which the width is two times longer than a normal print size, the size of the panoramic photoprint being the same as that obtained from a "Film with Lens: PANORAMIC HI" (trademark) available from Fuji Photo Film Co., Ltd.

The mask plates 18 and 20 can be swung by sliding a photographic mode selecting knob 22 mounted at the upper left of the exposure aperture 14 as seen in FIG. 1. When a film is loaded, one of the full-size and panoramic photography modes is selected, and the selected photography mode is maintained unchanged until all frames of a film are taken. As an alternative, if the photography mode selecting knob 22 is mounted on the camera body 10 so as to be accessible from the outside, then the photography mode can be changed each time one frame is taken.

Figure 2:
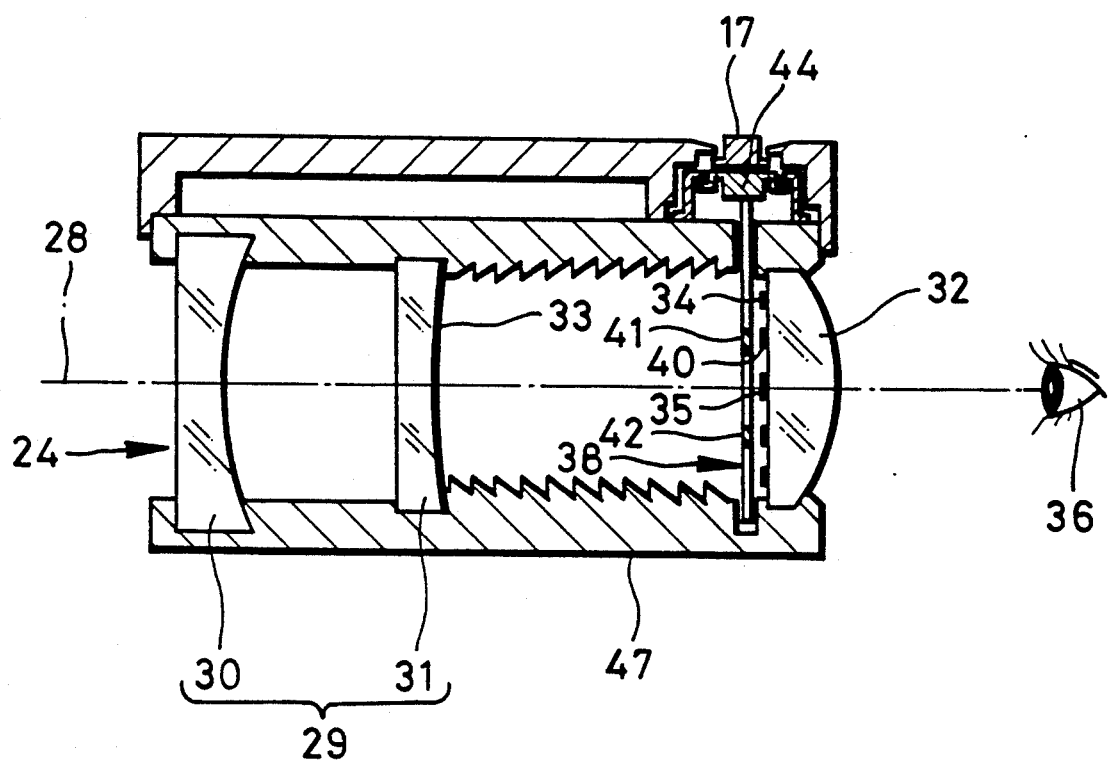
FIG. 2 is a cross section of an Albada-type inverted Galilean view finder incorporated in the compact camera shown in FIG. 1.

A view finder 24 for observing the subject is provided above the photography mode selecting knob 22. This view finder 24 is, in the illustrated embodiment, an Albada-type inverted Galilean finder such as is shown in FIG. 2. An Albada-type inverted Galilean finder has an objective 29 comprised by concave objective lenses 30 and 31 having a negative power and a positive eyepiece 32, respectively disposed on the finder optical path 28.

Figure 4:
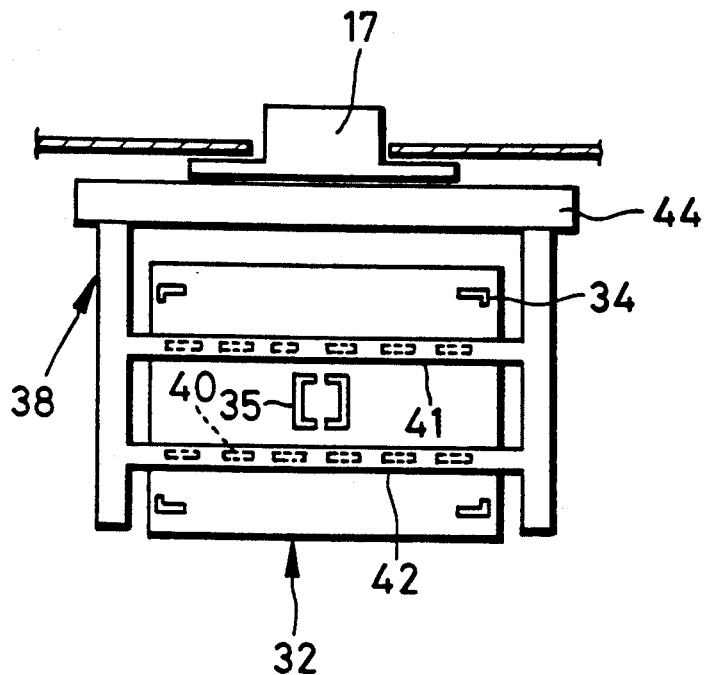
FIG. 4A illustrates the state wherein a blocking member is positioned in the full-size photography mode.
FIG. 4B illustrates the finder field in the full-size photography mode.
Figure 4:
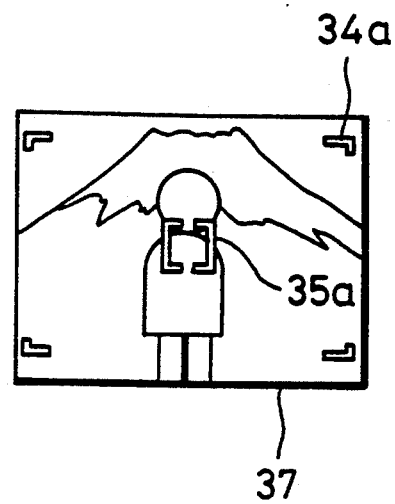
Figure 5:
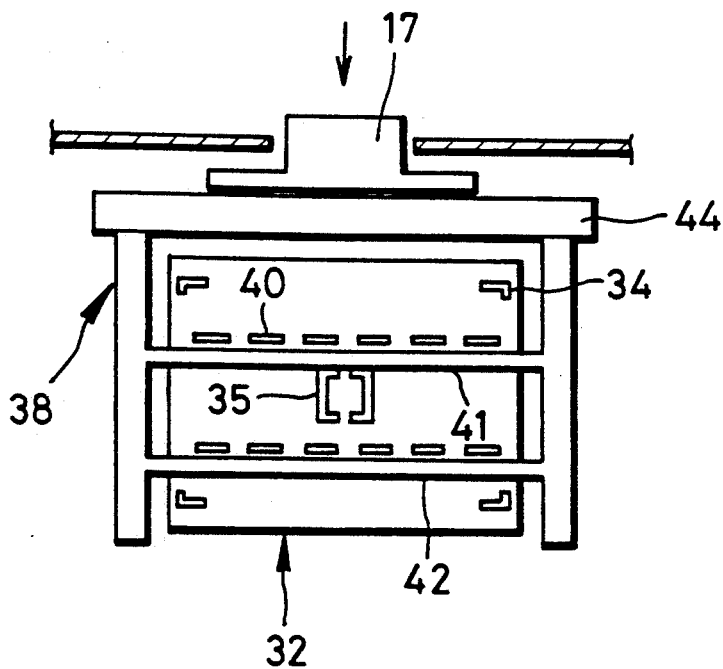
FIG. 5A illustrates the state wherein the blocking member is positioned the panoramic photography mode.
FIG. 5B illustrates the finder field in the panoramic photography mode.
Figure 5:
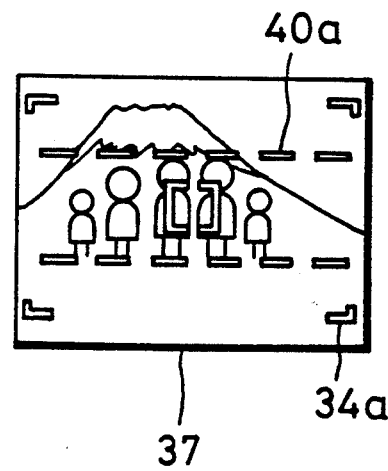

On the side of the eyepiece 32 facing the concave lens 31, formed by means of aluminum vapor deposition, are a range finding area mark 35 indicating a range finding area at the center of the eyepiece, a finder field frame 34 indicating the photographing area in the full-size photography mode, and a finder field frame 40 indicating the photographing area in the panoramic photography mode, as shown in FIGS. 4A and 5A. On the side of the concave lens 31 facing the eyepiece 32, there is formed a half-mirror 33 so that light reflected from the marks 34, 35 and 40 is reflected by the half-mirror 33 and reaches the photographer's eye 36 via the eyepiece 32. Objective lens 29 may instead be comprised by a single concave lens 30. In this case, the half-mirror is formed on the rear side of the concave lens 30.

A blocking member 38 is disposed between the concave lens 31 and eyepiece 32 so that the panoramic field frame 40 is masked to allow observing only the full-size field frame 34. The blocking member 38 is opaque and is made of black-colored plastic and has two light-shielding bars 41 and 42 formed integrally at positions corresponding to the upper and lower margins of the panoramic field frame 40 when the blocking member 38 has the position shown in FIG. 4A. The blocking member 38 moves down to expose the panoramic field frame 40 when the field frame selection button 17 is depressed. The stroke of movement of the blocking member 38 is set to be a minimum, that is, to be only that by which the marks indicating the panoramic field frame 40 can be exposed or covered, as seen by comparison of FIGS. 4A and 5A. Since the blocking member 38 is mounted near the eyepiece 32, the light-shielding bars 41 and 42 are out of focus to the eye of the user, thereby preventing the photographer from seeing them clearly.

Figure 3:
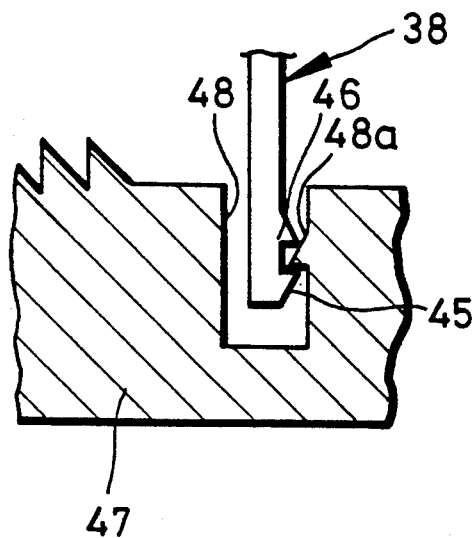
FIG. 3 is a cross section showing a locking mechanism for a blocking member.

A resilient member 44 of rubber or the like is coupled to the upper side of the blocking member 38 to urge the latter upward. There are formed, at the lower end of the blocking member 38, a locking claw 45 for locking the blocking member 38 in a fixed position and a releasing claw 46 for releasing member 38 from the locked state. See FIG. 3. As the field frame selecting button 17 is depressed and the blocking member 38 moves downward, the locking claw 45 comes into engagement with an engaging claw 48a formed on the inner wall of a guide groove 48 of a finder main body 47. As a result, the blocking member 38 is moved to the position wherein the light-shielding bars 41 and 42 are superposed on the panoramic field frame 40. In this state, when the field frame selection button 17 is again depressed, the lock releasing claw 46 comes into contact with the engaging claw 48a so that the blocking member 38 is retracted to the left as viewed in FIG. 3 and released from the locked state, the blocking member 38 then moving upward. Instead of the mechanism illustrated in FIG. 3, another well-known locking mechanism adapted to be unlocked upon being pushed twice may be used, e.g. a locking mechanism having a rotary locking plate. Furthermore, it is preferable that the photography mode selecting knob 22 be capable of being omitted by such operation of the button 17, and that the operation of the button 17 carry out the selection of the finder image frame and the definition of the exposure area.

The operation of the view finder constructed as above will next be described. A film cassette is loaded in the film supply chamber 11, and the photography mode selecting knob 22 is operated to select one of the full-size and panoramic photography modes. After the rear door is closed, the field frame selecting button 17 is operated in accordance with the selected photography mode.

For the selection of the full-size photography mode, the photography mode section knob 22 is slid upward to set the full-size photography mode, and the field frame selecting button 17 is set to project upward as shown in FIG. 4A. As the photography mode selecting knob 22 is slid upward to set the full-size photography mode, the mask plates 18 and 20 are retracted to open fully the exposure aperture 14. The blocking member 38 on the other hand is fixed in the upper position so that the markers of the panoramic field frame 40 are covered by the light-shielding bars 41 and 42. The subject is observed through the objective lens 29 and eyepiece 32, and the full-size field frame 34 is observed by the half-mirror 33 and eyepiece 32. Accordingly, as shown in FIG. 4B, it is possible to observe within the finder field 37 an image 35a of the range finding area mark 35 and an image 34a of the full-size field frame 34 together with an image of the subject. In this case, the markers of the panoramic field frame 40 cannot be observed. The photographer can therefore recognize the full-size photography mode, and frame the subject such that it lies within the area defined by the image 34a of the full-size field frame 34. Upon depression of the shutter button 16, an image substantially the same as that of the subject within the area defined by the image 34a of the full-size field frame 34 is formed on the film via the fully opened exposure aperture 14.

On the other hand, if the panoramic photography mode is selected by sliding downward the photography mode selecting knob 22 as shown in FIG. 1 when the film is loaded, the mask plates 18 and 20 are swung to shield the upper and lower portions of the exposure aperture 14. When the field frame selecting button 17 is depressed, the blocking member 38 moves downward as shown in FIG. 5A against the force of the resilient member 44 thereby to expose the markers of the panoramic field frame 40. As shown in FIG. 5B, an image 40a of the panoramic field frame 40 can be observed which is more conspicuous than the image 34a of the full-size field frame 34. The photographer can therefore recognize the panoramic photography mode and frame the subject such that it is disposed within the area defined by the image 40a of the panoramic field frame 40. In the panoramic photography mode, an image substantially the same as that of the subject within the area defined by the image 40a of the panoramic field frame 40 is formed on the film via the exposure aperture 40 whose size was limited by the mask plates 18 and 20.

Figure 6:
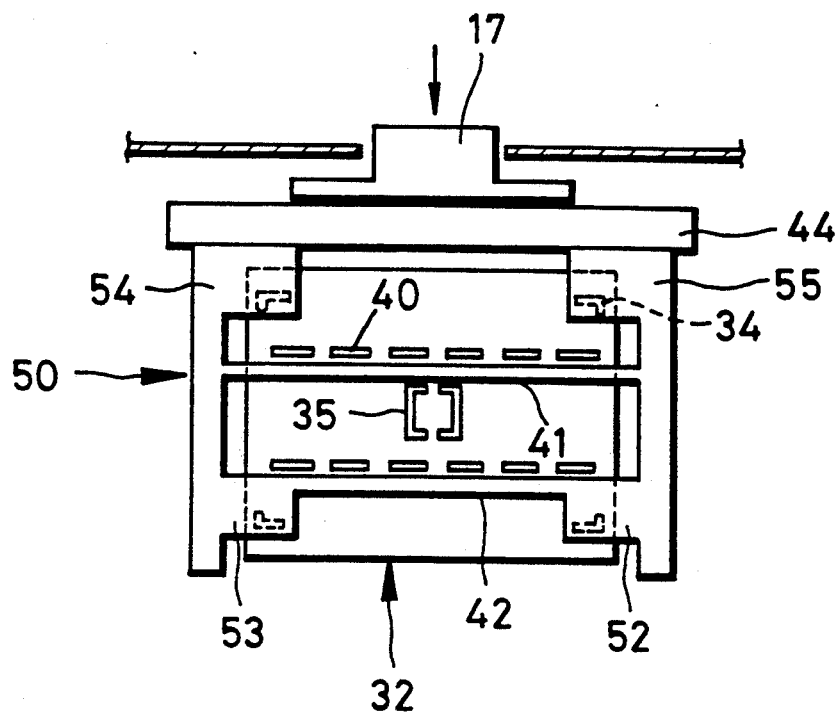
FIG. 6 shows another embodiment of the blocking member.
Figure 7:
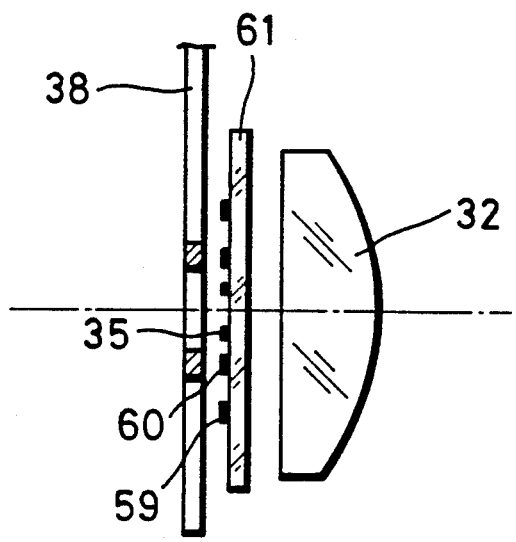
FIG. 7 shows another embodiment wherein two types of finder field frames are formed on a transparent plate.

FIG. 6 shows another embodiment of a blocking member. A blocking member 50 has four light-shielding areas 52 to 55 at its four corners for shielding the full-size field frame 34. The four light-shielding areas 52 to 55 light-shield the full-size field frame 34 and expose only the panoramic field frame 40 in the panoramic photography mode. In this embodiment, only one of the full-size and panoramic field frames is observed so that there occurs no framing error. In the embodiment shown in FIG. 7, a transparent plate 61 formed with a full-size field frame 59 and a panoramic field frame 60 is disposed between blocking member 38 and eyepiece 32 without finder field frames.

Figure 8:
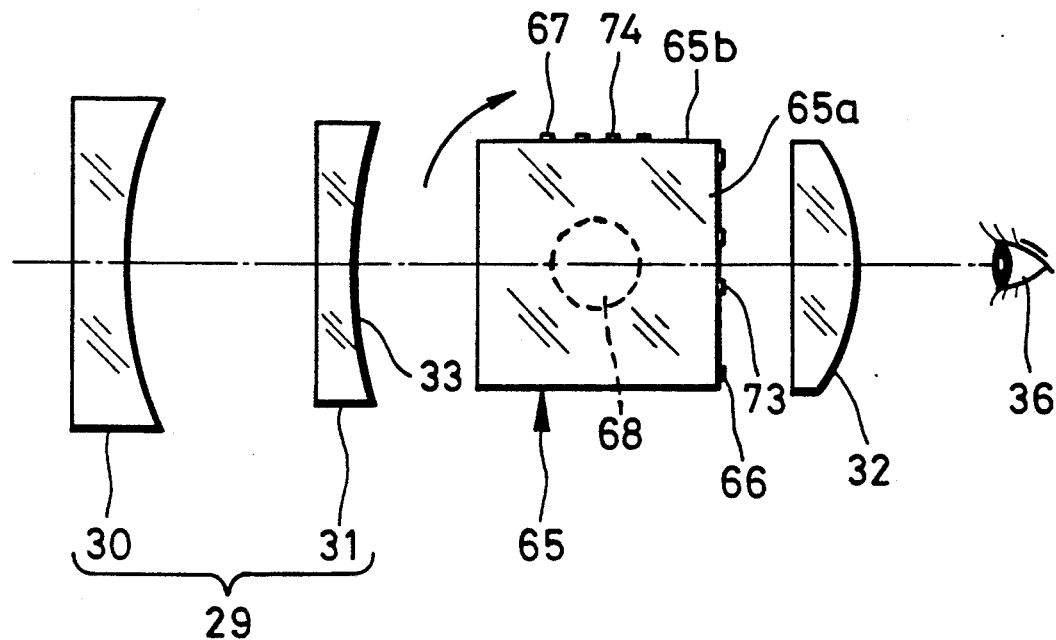
FIG. 8 shows a finder optical system using a transparent and rotatable body.
Figure 10:
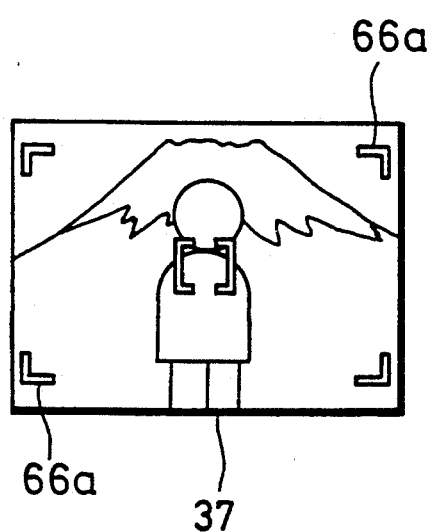
FIG. 10A shows a finder field in the full-size photography mode.
FIG. 10B shows a finder field in the panoramic photography mode.
Figure 10:
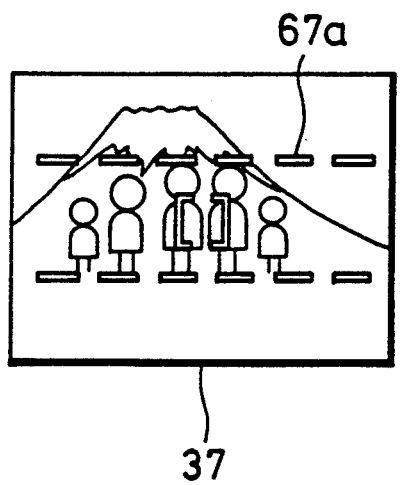
Figure 9:
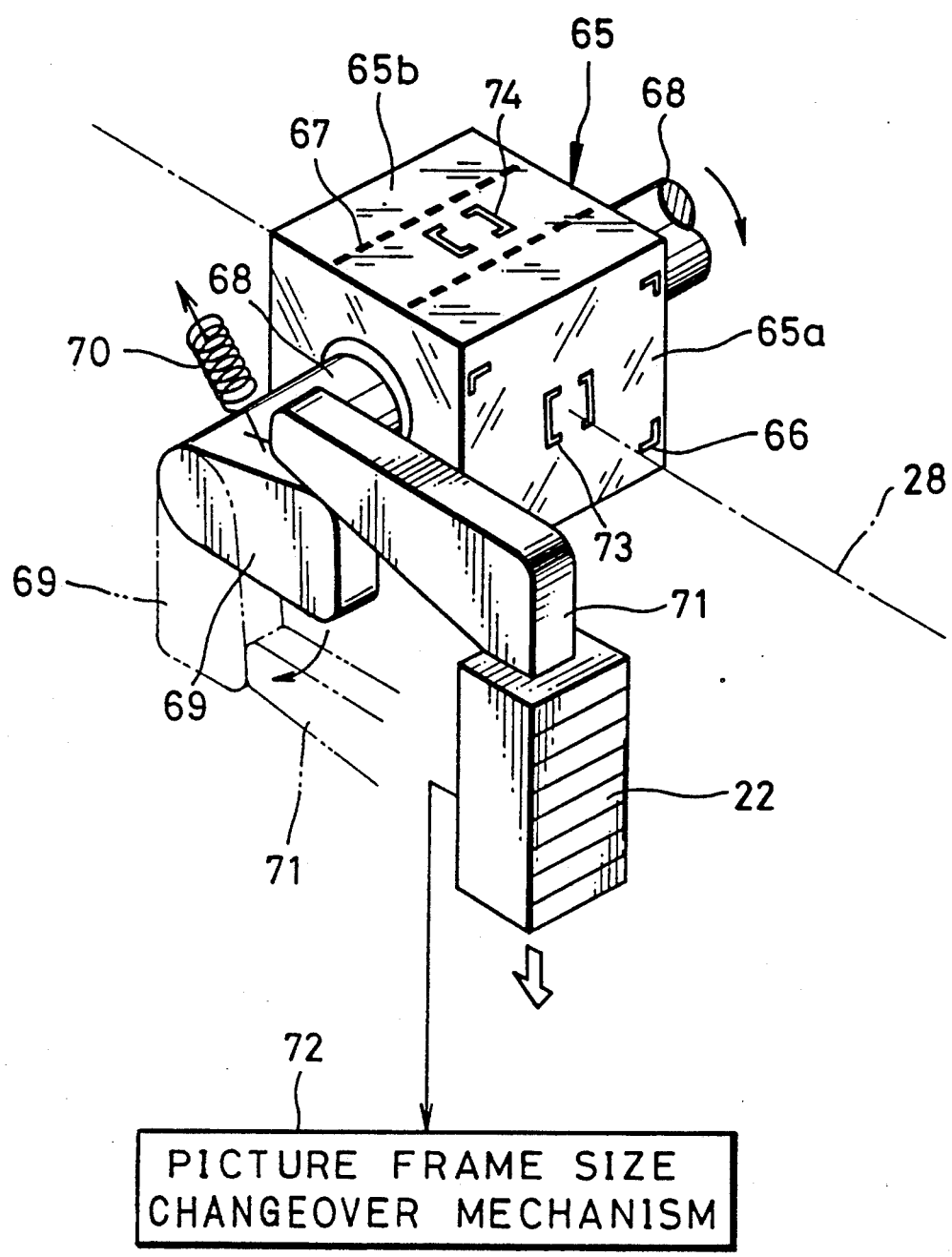
FIG. 9 is a perspective view of a finder field frame selecting mechanism used with the embodiment shown in FIG. 8.
Figure 11:
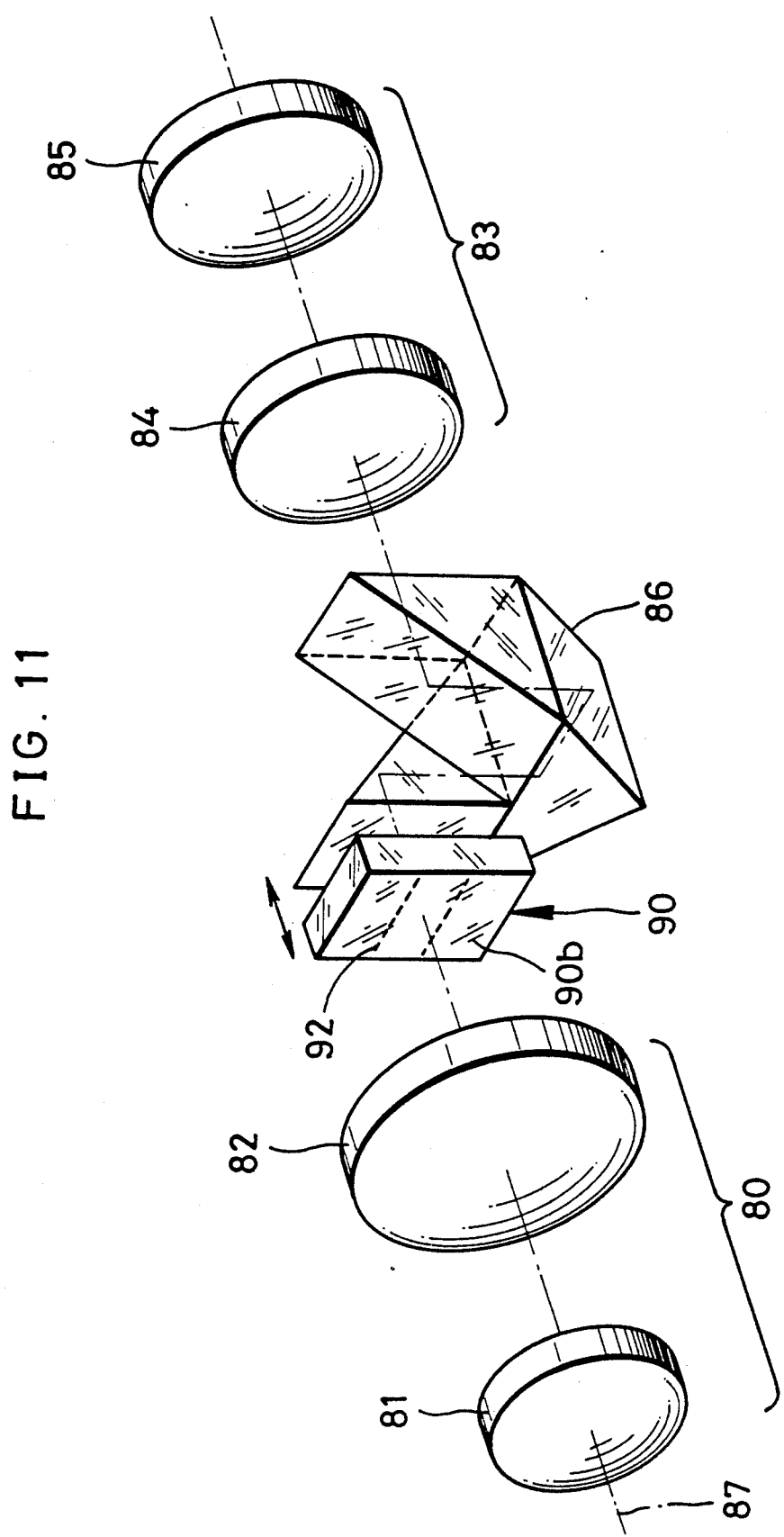
FIG. 11 shows the optical system of a Keplerian view finder.

Another embodiment of this invention is shown in FIGS. 8 to 10 wherein elements similar to those shown in FIG. 2 are represented by using identical reference numerals. A field frame body 65 rotatable by 90 degrees is disposed between eyepiece 32 and concave lens 31. This field frame body 65 is made of transparent plastic or glass and has a full-size field frame 66 and a panoramic field frame 67 formed on two surfaces 65a and 65b thereof. The transparent field frame body 65 may be hollow. Reference numerals 73 and 74 represent a range finding area mark. A pair of shafts 68 is integrally formed on opposite sides of the field frame body 65, parallel to the surfaces 65a and 65b. The shafts 68 are rotatably supported by the finder main body. As is shown in FIG. 9, an arm 69 is integrally formed at the left end of one shaft 68. The arm 69 is urged counter-clockwise by a spring 70. The arm 69 is adapted to contact a lever 71 integrally formed with the photography mode selecting knob 22. The photography mode selecting knob 22 selects the finder field frame, and at the same time causes a picture frame size changeover mechanism 72 to operate so that the mask plates 18 and 20 shown in FIG. 1 are swung.

In this embodiment, when the photography mode selecting knob 22 sets the upper position, the field frame body 65 has a position wherein the image 66a of the full-size field frame is displayed within the finder field, as shown in FIG. 10A. In the full-size photography mode, the picture frame size changeover mechanism 72 causes the mask plates 18 and 20 to be retracted and the exposure aperture 14 to be fully opened.

When the photographing mode selecting knob 22 is slid downward, the arm 69 in contact with the lever portion 71 is rotated to the position indicated by a two-dot-chain line. As a result, the panoramic field frame 67 on the field frame body 65 is positioned in the finder optical path 28 so that an image 67a of the panoramic field frame 67 is displayed within the finder field as shown in FIG. 10B. In the panoramic photography mode, the mask plates 18 and 20 are operated as the photography mode selecting knob 22 is operated, thereby to select the panoramic size of picture frame.

FIGS. 11 to 14 show an embodiment of a Keplerian view finder. This Keplerian view finder is comprised by an objective lens 80 having two convex lenses 81 and 82, an eyepiece 83 having two convex lenses 84 and 85, and a Porro prism 86 interposed between the objective lens 80 and the eyepiece 83. Reference numeral 87 represents the finder optical path.

Figure 12:
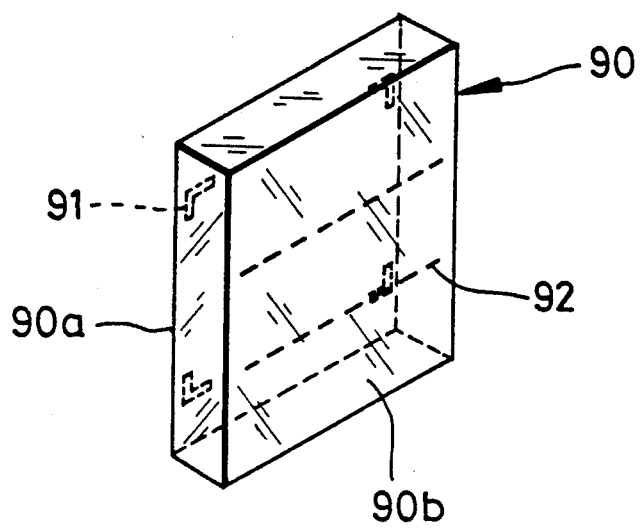
FIG. 12 is a perspective view of the finder field frame plate shown in FIG. 11.
Figure 13:
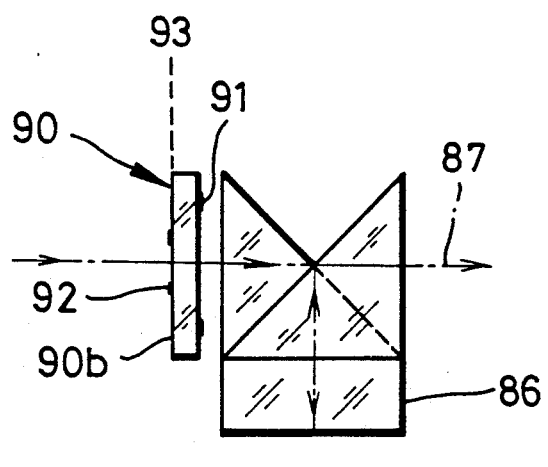
FIG. 13A is a side view showing the position of the finder field frame plate in the panoramic photography mode.
FIG. 13B is a side view showing the position of the finder field frame plate in the full-size photography mode.
Figure 13:
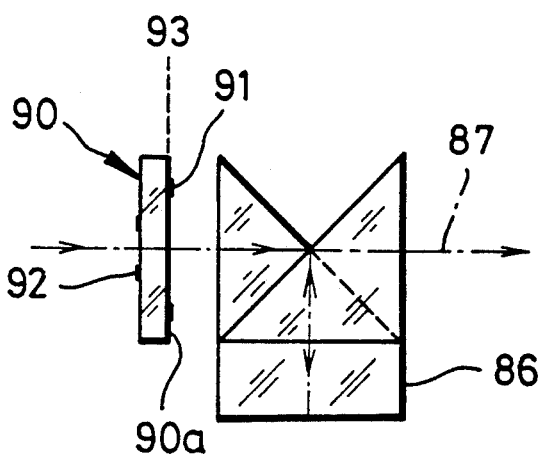

Between the Porro prism 86 and objective lens 80, there is slidably disposed a transparent field frame plate 90 having a full-size field frame 91 formed on one side 90a and a panoramic field frame 92 formed on the opposite side 90b, as shown in FIG. 12. Although a range finding area mark is not shown in FIG. 12, this mark is actually formed on the two sides 90a and 90b. The field frame plate 90 moves along the finder optical path 87 to dispose one of the field frames in the real image plane 93 (refer to FIG. 13A). An image of a subject is formed in the real image plane 93 so that it is superposed on a sharply focused image of only the selected finder field frame, the other finder field frame being spaced from the plane 93 and so appearing out of focus to the photographer. The top and bottom, and right and left of the composite real image is reversed by the Porro prism 86, and the erect image enlarged by the eyepiece 83 is observed. Two or more field frame plates may be laminated and adhered together to provide three or more types of finder field frames.

When the field frame plate 90 is positioned as shown in FIG. 13A, the panoramic field frame 92 is disposed in the real image plane 93 so that both the panoramic field frame 92 and the image of a subject can be observed, as in the case shown in FIG. 10B. The full-size field frame 91 is spaced from the real image plane 93 so that it cannot be observed. When the field frame plate 90 is positioned as shown in FIG. 13B, the full-size field frame 91 is disposed in the real image plane 93 so that both the full-size field frame 91 and the image of the subject can be observed.

Figure 14:
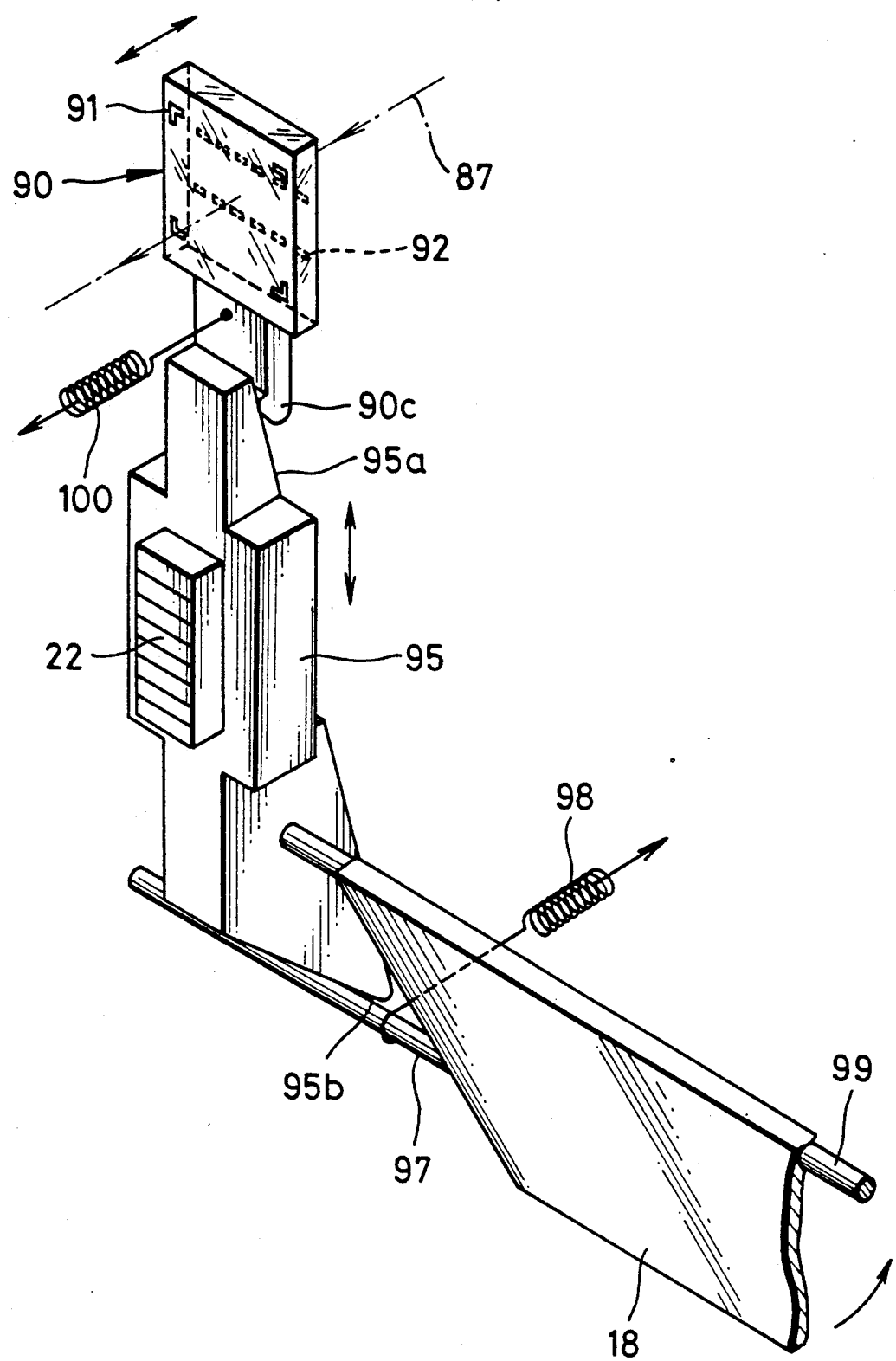
FIG. 14 is a perspective view showing the finder field frame selecting mechanism used with the embodiment shown in FIG. 11.

FIG. 14 shows an example of the finder field frame selecting mechanism. A cam member 95 is fixedly mounted on the photography mode selecting knob 22. A tapered portion 95a formed at the upper end of the cam member 95 is in contact with a follower portion 90c which is fixedly coupled to the lower end of the field frame plate 90 so that the field frame plate 90 moves along the finder optical path 87. A tapered portion 95b formed at the lower end of the cam member 95 is in contact with a pin 97 of the mask plate 18 so that the mask plate 18 is swung.

When the photography mode selecting knob 22 is pushed upward, the mask plate 18 swings about a shaft 99 under the force of a spring 98, thereby fully to open the exposure aperture 14. The other mask plate 20 is arranged to swing as the mask plate 18 swings. At the same time, the field frame plate 90 moves toward the objective lens 80 against the force of a spring 100 so that the full-size field frame 91 is positioned in the real image plane 93.

When the photography mode selecting knob 22 is pushed downward, the mask plate 18 swings downward against the force of the spring 98 so that the upper portion of the exposure aperture 14 is shielded and the picture frame size is set to the panoramic size. At the same time, the field frame plate 90 moves away from the objective lens 80 along the finder optical path 87 so that the panoramic field frame 92 is positioned in the real image plane 93. In order to prevent the photography mode selecting knob 22 from being unnecessarily moved by the spring 98, it is preferable to increase the resistance to sliding of the photography mode selecting knob 22, or to provide the photography mode selecting knob 22 with a well-known click-stop mechanism.

In the above embodiments, the finder field frame is changed over between the full-size photography and panoramic photography modes. But the invention is also applicable to changing over a finder field frame between telephotography and wide angle photography modes, between normal photography and close-up photography modes, and between full-size photography and half-size photography modes. Furthermore, the finder field frame may be changed over in accordance with the distance to the subject in order to correct parallax. Still further, this invention is applicable not only to a compact camera but also to a disposable camera of the type wherein a film is already loaded therein, and to other cameras. Various changes and modifications of this invention are possible which are to be construed as being within the protected scope of this invention.

What is claimed is:

1. A view finder having an objective lens, a half-mirror, and an eyepiece respectively disposed along a finder optical path, comprising:
   at least first and second finder field frames of different types, each finder field frame indicating a photography area and being disposed between said eyepiece and said half-mirror;
   said first finder field frame comprising marks in four corners of a photographer's field of view through the view finder for indicating the field of view in a first photography mode;
   said second finder field frame comprising two lines of spaced apart marks extending across a photographer's field of view in the view finder and spaced between said corner marks, to indicate the field of view in a second photography mode; and
   a blocking member disposed adjacent said finder field frames between said finder field frames and said half-mirror for selectively masking said second finder field frame from observation by a user of the view finder looking through said eyepiece;
   said blocking member having spaced apart blocking portions integral with each other and movable together in the same direction for simultaneously blocking or exposing said second finder field frame, said blocking portions comprising two light-shielding bars that are spaced apart and that expose the field of view in said first photography mode on opposite sides of said light-shielding bars and between said light-shielding bars and that cover both of said lines of spaced apart marks in said first photography mode and that expose both of said lines of spaced apart marks in said second photography mode.

2. A view finder according to claim 1, further comprising means for urging said blocking member toward one of first and second positions each of which corresponds to a different one of said photography modes, and locking means for releasably retaining said blocking member in the other of said first and second positions.

3. A view finder according to claim 1, said blocking member having blocking portions that mask only said corner marks in said second photography mode and that expose said corner marks in said first photography mode, said corner portions being spaced from said light-shielding bars.

4. A view finder having an objective lens, a half-mirror, and an eyepiece respectively disposed along a finder optical path, comprising:
   a cubic transparent member rotatably disposed between said half-mirror and said eyepiece, a first finder field frame being formed on a first surface of said transparent member, and a second finder field being formed on a second surface of said transparent member which borders said first surface; and
   means for selectively positioning either one of said first and second surfaces of said transparent member perpendicular to and in said finder optical path.

5. A view finder according to claim 4, wherein said objective lens has a negative power, and said eyepiece has a positive power.

6. A view finder according to claim 5, wherein said half-mirror is formed on a surface of said objective lens facing said eyepiece.

7. A view finder according to claim 4, wherein said first finder field frame indicates a panoramic photography area, and said second finder field frame indicates a full-size photography area.

8. A view finder according to claim 7, further comprising means for changing the size of an exposure aperture in cooperation with said selectively positioning means.

9. A view finder having an objective lens, a prism, and an eyepiece respectively disposed along a finder optical path, comprising:
 a transparent member formed with at least first and second finder field frames spaced apart by a predetermined distance; and
 shift means for moving said transparent member along said finder optical path and for selectively positioning either one of said first and second finder field frames in a real image plane of said objective lens.

10. A view finder according to claim 9, wherein said objective lens and said eyepiece have a positive power, and said prism is a Porro prism.

11. A view finder according to claim 10, wherein said transparent member is a transparent plate, said first finder field frame being formed on one surface of said transparent plate, and said second finder field frame being formed on the opposite surface of said transparent plate.

12. A view finder according to claim 9, wherein said first finder field frame indicates a panoramic photography area, and said second finder field frame indicates a full-size photography area.

13. A view finder according to claim 12, further comprising means for changing the size of an exposure aperture in cooperation with said moving means.

* * * * *